United States Patent

Longland et al.

[15] 3,641,324
[45] Feb. 8, 1972

[54] POSITION BUSY SIGNALING APPARATUS

[72] Inventors: John R. Longland; Roy M. Williams, Jr., both of Nashua, N.H.; Howard D. Sutton, Millington, N.J.

[73] Assignee: Sanders Associates, Inc., Nashua, N.H.

[22] Filed: Apr. 21, 1969

[21] Appl. No.: 817,828

[52] U.S. Cl. .................................... 235/151, 340/146.2
[51] Int. Cl. ................................................. G06f 15/20
[58] Field of Search .................... 235/151, 177; 340/146.2; 315/18

[56] References Cited

UNITED STATES PATENTS

| 2,905,931 | 9/1959 | Lubkin | 340/146.2 X |
| 3,348,201 | 10/1967 | Colburn et al. | 340/146.2 X |
| 3,372,268 | 3/1968 | Hoernes | 235/151 X |
| 3,493,732 | 2/1970 | Zeheb | 235/151 X |

Primary Examiner—Malcolm A. Morrison
Assistant Examiner—Edward J. Wise
Attorney—Louis Etlinder

[57] ABSTRACT

The Position Busy Signaling Apparatus is an open loop position busy generator for signaling the duration or completion of a position move for an imaging device in a display system. A display surface is divided into a grid of equal distance units along X and Y axial directions. The position distance $\Delta L$ is calculated for the larger of the X and Y axial distance to be travelled. A clock source increments a counter at a rate corresponding to the travel rate of the imaging device so as to provide incremental reference distances as the imaging device traverses the position distance. A comparator compares the position distance with successive incremental reference distances. When a less than or equal comparison is obtained, a signaling circuit signals that the position move has been completed.

6 Claims, 5 Drawing Figures

INVENTORS
JOHN R. LONGLAND
ROY M. WILLIAMS, Jr.
HOWARD D. SUTTON

BY Robert R. Hubbard
ATTORNEY 3,641,324

POSITION BUSY SIGNALING APPARATUS

BACKGROUND OF THE INVENTION

This invention relates to novel and improved display-generating systems and in particular to an open loop position busy generator for such systems.

The position busy generator of the present invention is useful, for example, in computer controlled cathode ray tube (CRT) display systems to provide a position busy control signal for the duration of a position move of the CRT beam between the locations of symbols which are traced on the CRT display screen. However, it is to be understood that the position busy generator can also be employed in other display systems which utilize a tracing technique as for example, automatic plotting mechanisms. The position busy control signal serves the purpose of signaling the display controller that a position move is currently under way. The display controller responds to the position busy signal to inhibit the operation of other display subsystems, as for example the symbol tracing subsystems.

Detection of a position move has been previously performed by means of a closed loop system in which the actual movement of the CRT beam was sensed from the CRT deflection coils. Such a system has been described in a copending application of Arnold Schumacher, entitled ADAPTIVE TIMING TECHNIQUE, Ser. No. 585,621, now U.S. Pat. No. 3,548,402, filed Oct. 10, 1966, and assigned to the assignee of this application. Such closed loop systems are adequate where design requirements permit position detection control lines to exist between the display indicator stations and the display-generating unit. However, in a multistation environment where it is desired to have a single display generator unit time shared by plural display indicators of different types, it is desirable to limit the number of control lines and to provide a standard interface between the indicators and the display generator unit. One such display environment is described in a copending application of Robert D. Stoddard, Arnold Schumacher, Grant W. Conley and Roy M. Williams, Jr. entitled Variable Rate Display Generator, Ser. No. 818,015, filed Apr. 21, 1969, and assigned to the present assignee. In addition, many display indicator units do not contain built in sensing circuitry such that modifications would have to be made to these units in order to employ a closed loop system. In such systems, it is therefore highly desirable to employ an open loop position busy signal-generating apparatus.

BRIEF SUMMARY OF THE INVENTION

An object of the present invention is to provide novel and improved open loop signaling apparatus.

Another object is to provide novel and improved signaling apparatus, especially adapted for use in a display system to signal the duration or completion of a positioning move by an imaging device.

In brief, the signaling apparatus of the present invention is embodied in a device which signals the duration or completion of a position move of an imaging device in a display system. A dynamic reference distance-generating means provides incremental reference travel distances during consecutive time intervals at a rate which corresponds to the travel rate of the imaging device. A comparator compares the position distance (distance to be travelled) with successive incremental reference distances. When a positive comparison is made, a signaling circuit responds to signal the completion of the positive move.

BRIEF DESCRIPTION OF THE DRAWINGS

In the accompanying drawing, like reference characters denote like components, and.

DESCRIPTION OF PREFERRED EMBODIMENT

The open loop position busy generator of the present invention may be employed in conjunction with any display equipment in which an imaging device, such as an electron gun, pen, photohead, and the like must be positioned (nontracing motion) from one location to another on a display surface. However, by way of example and completeness of description, the invention will be herein described in terms of an electron gun CRT beam position move.

For a rather complete description of a computer controlled display generator system for a multistation environment, reference is made to the aforementioned copending patent application of Robert D. Stoddard et al. Suffice it to say here that in a computer controlled display system, a display generator responds to an instruction set provided by the computer to generate X-, Y- and Z-axis modulating signals which are applied to a CRT indicator to cause the CRT beam to deflect in a pattern which traces symbols (e.g., lines, curves, alphanumerics, etc.) at various locations on the display surface. The display generator includes a controller which responds to the instruction set to direct symbol tracing subsystems, such as line or character generators, to trace the symbol pattern. According to the cursive writing technique described in the Stoddard et al. patent application, a particular symbol in an instruction set is traced out directly on the CRT screen in two steps. First, the electron beam in the CRT is positioned at the location on the screen where the particular symbol is to be displayed. During this positioning time the beam is blanked (turned off). Then the symbol is traced at that location. During this tracing period the beam is unblanked (turned on) so that an observer may view the symbol. The beam is then blanked and positioned to another CRT screen location where another symbol of the instruction set is to be displayed. This other symbol is traced and the beam is then positioned for the next symbol, and so on, until all symbols contained in the instruction set have been traced. This procedure is then repeated again and again at a suitable refresh rate in order to provide a continuous visual presentation of the symbol set.

Figure 1:
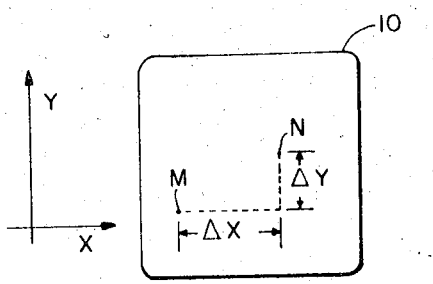
FIG. 1 is a plan view of a display surface illustrating a typical position move.

Although many different operating modes of a display system are possible (e.g., the simulation of a raster scan with position moves), the invention will be described for a symbol tracing mode in which position moves are required between the display surface locations of consecutively traced symbols. An example of such a position move is depicted on the display screen 10 in FIG. 1 where M represents the terminal point of a symbol which has just been traced and N represents the starting point of the next symbol which is to be traced. The horizontal and vertical directions for the display surface 10 are the X- and Y-directions, respectively, as designated by the X and Y coordinate axes adjacent display screen 10. Upon completion of the tracing of the symbol at location M, the display controller directs the display line generator to generate X and Y deflection signals to move the CRT beam to location N. This directive generally takes the form of a position start (POST) signal. The function of the position busy generator of the present invention is to respond to the POST signal to predict the arrival time of the beam at location M, at which time it signals the display controller that the position move has been completed. This is accomplished in the illustrated embodiment by means of a position busy signal to the display controller.

According to the invention, the distance between locations M and N is computed and then compared during regular time intervals with successive incremental reference distances. When a comparison is accepted, the position busy generator signals the display controller that the position move has been completed. It is to be noted that the time of a position move is a function of the larger axial distance traveled. Thus, for FIG. 1 example, the position time is a function of the larger ΔX component and not of the resultant of the ΔX and ΔY components.

Figure 2:
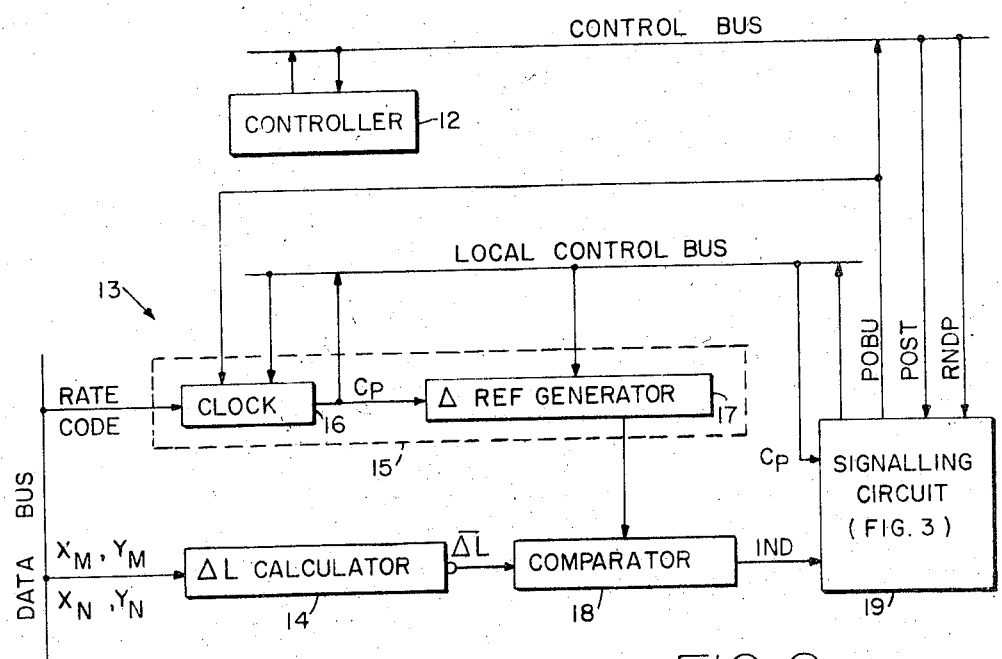
FIG. 2 is a block diagram of a position busy signaling apparatus embodying the present invention.

Referring to FIG. 2, a position busy generator embodiment of the invention is illustrated in a portion of a display generator environment in which a display controller 12 directs the generation of display signals via a CONTROL BUS and a DATA BUS provides data signals to the position busy generator 13 as well as to other portions of the display generator not shown. The FIG. 2 sketch is further simplified by the omission of data holding or buffer registers and gating circuits which hold and gate data signals from the DATA BUS to the position busy generator 13 upon command from controller 12 via the CONTROL BUS.

The position busy generator 13 includes a position distance ΔL calculator 14, a dynamic reference distance Δref generator 15, a comparator 18 for comparing ΔL with successive values of Δref, and a signaling circuit 19 for signaling the completion of a position move as well as providing control signals via a Local Control Bus to the dynamic generator 15. It is to be understood that though each of the buses in FIG. 2 is shown as a single line, each such bus actually consists of a number of leads, one for each different signal.

The signaling circuit 19 receives the position start POST signal and a random position RNDP signal from controller 12 via the CONTROL BUS when a position move is desired. The RNDP signal is essentially a conditioning or modal signal which, though not necessary, may be employed to provide the display generator with various operational modes. The signaling circuit 19 responds to the POST and RNDP signals to initiate a number of individual control signals which are applied to the dynamic reference generator 15. After a short initializing delay, signaling circuit 19 then produces a position busy POBU signal which signals controller 12 that the position move has started. The POBU signal also initiates operation of the dynamic reference generator 15. The signaling circuit 19 also includes a delay portion which masks any unwanted signals emanating from the ΔL calculator during the ΔL calculating interval.

The ΔL calculator 14 receives from the DATA BUS the X and Y coordinates of both the initial and terminal points of the position move, calculates the ΔX and ΔY distance components, compares the ΔX and ΔY components, and outputs the larger component (ΔL) of the two components to comparator 18. To this end, ΔL calculator 14 may include a pair of subtracting circuits, one for computing ΔX and one for computing ΔY, and a comparator for comparing ΔX and ΔY and outputting the larger ΔL of the two. It should be noted at this point that the ΔX and ΔY values are also generally required by the display line generator (not shown) which actually generates the X and Y deflection signals for the CRT. Accordingly, portions of the ΔL calculator can be shared by both the line generator and the position busy generator 13.

The dynamic reference distance Δref generator 15 divides the time required for a full display surface position move into equal time increments and dynamically outputs a reference distance Δref for each time increment. To this end, generator 15 includes a timing or clock section 16 and a Δref generator 17. The clock 16 has a frequency such that the CRT imaging device travels one unit of display surface distance during each clock cycle or period. The clock 16 is illustrated as receiving a rate code from the DATA BUS so as to be programmable to the travel rates or speeds of different types of imaging devices.

Any suitable programmable clock source may be employed for clock 16. By way of example, clock 16 may include an oscillator (not shown) initialized by signalling circuit 19 and enabled by the leading edge of the position busy POBU signal to provide an oscillator signal and a frequency divider (not shown) which divides the oscillator signal and a frequency according to the rate code to provide clock pulses at a rate corresponding to the imaging device under consideration. This rate code division of the clock oscillator signal then provides a coarse step-type control of the clock rate. A fine or vernier control can also be provided. For example, the rate code can also be employed to select one of several oscillator frequency control devices (such as variable resistors or variable reactive components) each of which may be separately adjustable to provide a desired clock oscillator frequency for a particular rate code. That is, both the clock oscillator frequency and the frequency divider can be programmed by a rate code so as to provide clock rates which more nearly correspond to the travel rates of different imaging devices. The trailing edge of the POBU signal functions to turn off the oscillator and, hence, clock 16.

The Δref generator 17, which is preferably a digital counter, is initialized (preset) by the signaling circuit 19 to produce a suitable initial Δref value. The counter 17 is then incremented by each clock pulse $C_p$ to provide successive Δref values to comparator 18 during consecutive clock cycles.

The comparator 18 compares the position distance ΔL with the successive Δref values during consecutive clock cycles and produces an output indicating signal IND to signaling circuit 19 when the Δref value equals the ΔL value for the example given below. Although the comparator 18 may employ any suitable comparator circuits, it may, for example, take the form of an adder circuit which produces an end carry output when the sum of the complement $\overline{\Delta L}$ of ΔL and Δref numbers is equal to $2^n$, where $n$ is the number of stages in the adder.

Although various conventions may be adopted for apportioning the display screen 10 (FIG. 1) a typical design for the position busy generator may be as follows. The display screen is divided into an X-, Y-grid of 2,048 equally spaced divisions in both X and Y. Thus a total of 4,194,304 points are defined. Considering the lower left corner to have coordinates of (0,0) and the upper right corner to have coordinates of (1,1), the center of the screen has coordinates, expressed in octal, of (0.40000, 0.4000).

Consider two coordinates $(X_1, Y_1)$ and $(X_2, Y_2)$. The value of the position distance D is defined to be either $(X_2-X_1)$ or $(Y_2-Y_1)$, whichever is larger. Thus, if the two coordinates, expressed in octal, are (0.3462, 0.5176) and (0.7102, 0.1404) the value of D is 0.3572 because (0.3462−0.7102)=0.3420 and (0.5176−0.1404)=0.3572, but 0.3572 is larger than 0.3420. This point is shown by an X and labeled with a D in FIG. 5. For a reasonable resolution or accuracy the value of ΔL is defined as the quantity D truncated to its four most significant bits. Thus in this example ΔL=0.0111 as shown with an X and labeled with a ΔL in FIG. 5.

Figure 5:
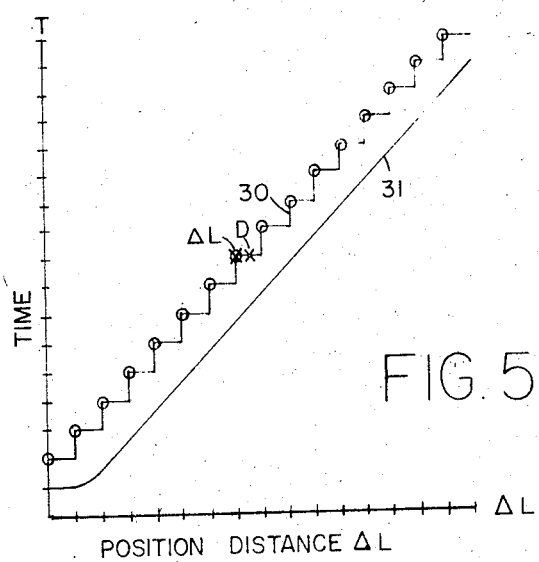
FIG. 5 is a time vs. position distance graph illustrating an exemplary design technique.

The small circles of curve 30 in FIG. 5 represent the 16 possible values of ΔL. The horizontal lines attached to each circle represent the values of D which could be represented by the values of ΔL. The linear curve 31 represents the function being approximated. It is important that the staircase curve 30 never goes below the linear curve 31. In addition, from a consideration of system tolerances, a definite margin of time should be allowed between the two curves. In the above-mentioned example the value of ΔL was 7/16; thus the value of T is 9 units because (7/16+⅛)(16)=9, where ⅛ represents an additional count of two units as described below.

In accordance with the foregoing description a value of 7/16 for ΔL represents a value of D less than ½ but greater than or equal to 7/16. Thus the valve of ΔL represents the value of D with an error of +1/16 and minus zero, which error is a result of post truncation. If pretruncation to four binary bits had been employed, the value of ΔL would have represented the value of D to an error of ±1/16. The result would have been a maximum time waste of 3 units of time. On the other hand, the above-described system has a maximum time waste of 2 units of time, as may be readily seen from FIG. 5.

In order to allow for the aforementioned system tolerances, the initial Δref value is such that an extra unit of travel time is allowed for a position move. In addition a further extra time unit is allowed for post-truncation error. That is, the position busy generator allows for a position-truncation error. That is, the position busy generator allows for a position move of $\Delta L+2$. Table I is illustrative of the operation of the $\Delta$ref counter 17 and the comparator 18 for several of the different values of $\Delta L$.

TABLE I

| Time Initial | Counter 17 ($\Delta$ref) | Axial Travel Distance | $\Delta L$ | $\overline{\Delta L}$ | Units of Time (POBU) |
|---|---|---|---|---|---|
| CP0 | 1111 | | | | |
| | 0000 | 0 to 1/16 | 0000 | 1111 | 2 |
| CP1 | 0001 | 1/16 to ⅛ | 0001 | 1110 | 3 |
| CP2 | 0010 | ⅛ to 3/16 | 0010 | 1101 | 4 |
| CP3 | 0011 | 3/16 to ¼ | 0011 | 1100 | 5 |
| CP4 | 0100 | ¼ to 5/16 | 0100 | 1011 | 6 |
| CP5 | 0101 | 5/16 to ⅜ | 0101 | 1010 | 7 |

According to Table I, the counter 17 is initially set to an all "1"'s condition. The least significant carry input to the adder is permanently forced to a 1. The first clock pulse CP0 increments this value to an all "0" condition. It should be noted here that the aforementioned delay provided by the signaling circuit 19 masks the output position busy POBU signal from responding to any comparisons being made by comparator 18 during CP0 time. The next clock pulse CP1 then increments counter 17 to a 0001 condition which corresponds to one to two units of axial travel distance. For the case where $\Delta L=3$, the adder type comparator 18 produces an end carry during CP4 time as the sum of 0011 ($\Delta$ref) and 1,100 ($\overline{\Delta L}$) and 0001 is 0000 with an end carry of "1." Thus, the adder 18 produces an end carry (IND) signal when $\Delta$ref=$\Delta L$. The aforementioned extra time units are allowed for in the signaling circuit 19 as explained hereinafter.

Figure 3:
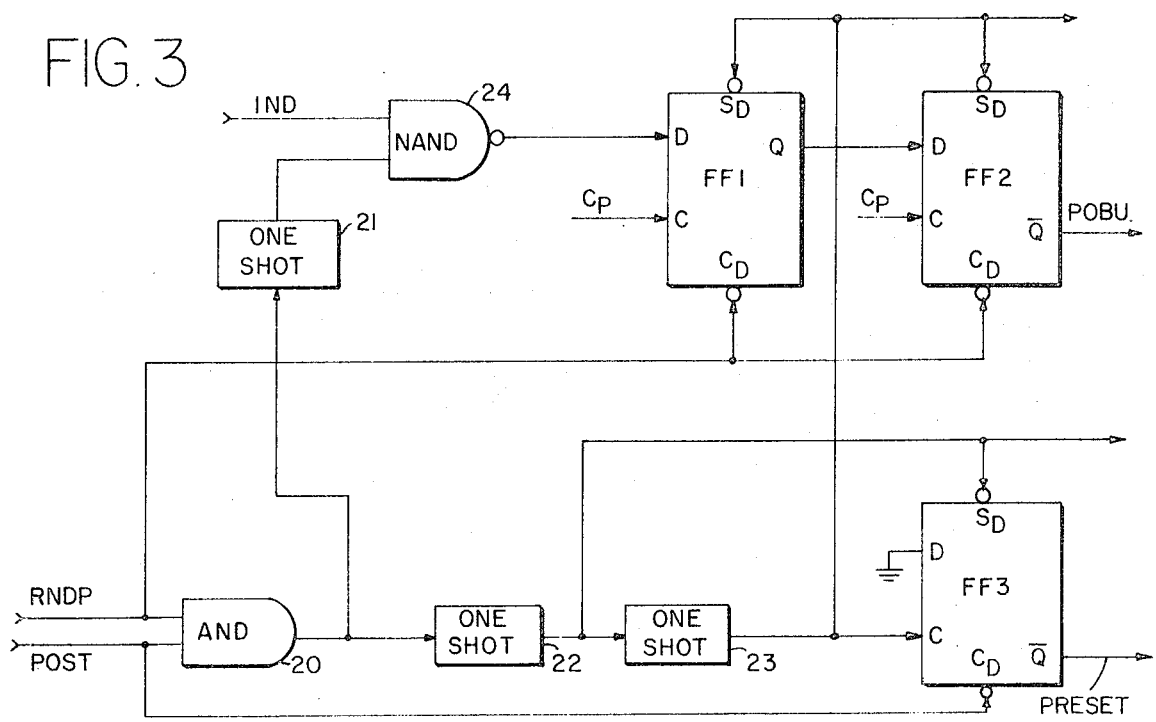
FIG. 3 is a schematic logic diagram of the signaling circuit portion of the FIG. 2 signaling apparatus.

Referring next to FIG. 3, there is illustrated an exemplary embodiment of the signaling circuit 19. In the FIG. 3 sketch, a number of one-shot multivibrators and a number of D-type flip-flops are employed. For the purpose of the description which follows, the outputs of the one shots are normally high and are switched low for the duration of the one shot delay in response to a high input signal. The D-type flip-flop is one in which there are two operational modes. In one mode, clock signals applied to a clock terminal cause a Q output to follow the logic level of a D input. Thus, if the D input is switched from low to high, the next clock signal switches the flip-flop Q output from low to high (assuming only clocked operation). In the other mode, a low signal applied to a set $S_D$ input causes the flip-flop Q output to assume a high level. On the other hand, a low signal applied to a clear $C_D$ input causes the Q output to assume a low level.

In the following description of the FIG. 3 signaling circuit embodiment, reference will be frequently made to the waveform diagram in FIG. 4 which shows the signal waveforms which occur at various points in the signaling circuit. The random position RNDP modal signal holds a pair of position busy flip-flops FF1 and FF2 in cleared conditions when it has a low (LO) value and conditions the signalling circuit 19 when it has a high (HI) value. Thus, in FIG. 4 the RNDP signal is shown as going HI at a time prior to $T_0$ and conditions the signalling circuit 19 in the following manner. First, it conditions FF 1 and FF 2 to respond to the position start POST signal as described below. The $\overline{Q}$ output of FF 2 is illustrated in the FIG. 4 waveform diagram as the position busy POBU signal. The POBU signal is normally switched high at the termination of a position move and, hence, the clearing operation by the RNDP signal merely assures that the POBU signal is HI just prior to time $T_0$. Secondly, the RNDP signal conditions an AND-gate 20.

The position start signal POST goes HI at time $T_0$ (FIG. 4), thereby enabling AND-gate 20 to trigger a relatively long delay one-shot 21 and a relatively short delay one-shot 22. The POST signal also conditions a preset flip-flop FF 3 to respond to the LO going output of one-shot 22 thereby forcing its $\overline{Q}$ output (the preset line) LO at time $T_0$. The preset line is fed by way of the Local Control Bus to the clock 16 and the $\Delta$ref generator 17 as shown in FIG. 2. The preset signal inhibits the clock oscillator and conditions the clock frequency divider for parallel entry and conditions the $\Delta$ref generator counter 17 for parallel entry.

The one-shot 21 is given a relatively long delay in order to inhibit a position busy NAND-gate 24 from responding to the end carry indicating signal IND from the output of the comparator 18 (FIG. 2). This delay serves the purpose of inhibiting or masking the position busy flip-flops FF 1 and FF 2 and NAND-gate 24 during a period in which the $\Delta L$ calculation is performed.

Figure 4:
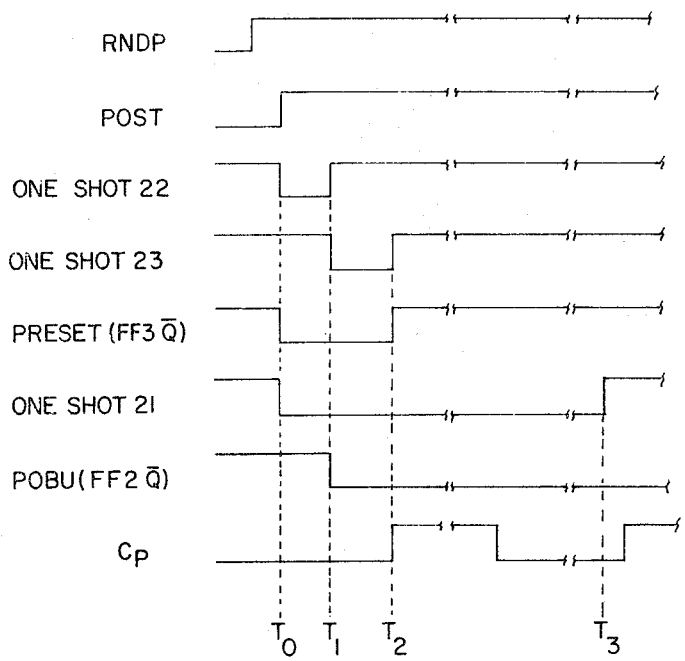
FIG. 4 is a waveform diagram illustrating the signal waveforms which occur at various points in the FIG. 3 logic diagram.

Still referring to FIGS. 3 and 4, the output of one-shot 22 is further applied as an input to another short delay one-shot 23.

At $T_1$ the output of one-shot 22 goes HI thereby triggering one shot 23 such that its output goes LO. The LO output of one-shot 23 is applied to the $S_D$ inputs of the position busy flip-flops FF 1 and FF 2. This serves the purpose of setting both FF 1 and FF 2, thereby causing the position busy POBU signal ($\overline{Q}$ of FF2) to go LO and signal the start of a position move. The output of one-shot 23 is also applied via the Local Control Bus to the $\Delta$ref generator and to the frequency divider of clock 16 (FIG. 2). This LO value signal at $T_1$ serves the purpose of setting the $\Delta$ref value to all "1"'s and of setting the clock frequency divider to all "1"'s.

At time $T_2$ the output of one-shot 23 goes HI and thereby triggers the preset flip-flop FF 3 such that its $\overline{Q}$ output (the preset line) goes HI, following the FF 3 D input which is connected to ground (LO level). When the preset line goes HI at $T_2$, the oscillator of clock 16 (FIG. 2) is enabled so as to commence producing clock pulses at this time. These clock pulses Cp are shown in FIG. 4 with broken waveforms to indicate the variable rate feature. As the clock pulses Cp begin at time $T_2$, the position busy flip-flops FF 1 and FF 2 are conditioned to operate on a clocked basis. However, the output of the long delay one-shot 21 is still LO at this time maintaining the NAND-gate 24 output HI. Consequently, the position busy flip-flops FF 1 and FF 2 are inhibited from switching until the end of the one-shot 21 delay at time $T_3$. After time $T_3$ the output of one-shot 21 is HI and conditions NAND-gate 24 to respond to the indicating signal IND output of comparator 18 (FIG. 2). When the comparator 18 does produce a HI going indicating signal IND ($\Delta$ref=$\Delta L$), NAND-gate 24 will be enabled to provide a LO signal to input D of flip-flop FF 1. The two extra time units mentioned previously for the given example are achieved as follows. Flip-flop FF 1 then switches on the next succeeding clock pulse Cp (one time unit) to force its Q output low. On the next clock pulse (second time unit) flip-flop FF 2 switches forcing its $\overline{Q}$ output, the POBU signal, HI. The HI going edge of the POBU signal, signals the display controller 12 (FIG. 2) via the CONTROL BUS that a position move has been completed. The POBU signal is also fed back to the clock 16 to terminate its operation.

In summary, there has been described an open loop-type position busy generator which predicts the completion time of a position move of an imaging device and which signals the display controller at such completion time. The completion time prediction is accomplished by means of a comparison of the larger axial distance of the position move with incremental travel distances of the imaging device as it traverses the position distance. The display controller is signalled upon a positive comparison in which the incremental travel distance corresponds to or exceeds the total distance. Although the illustrated embodiment employs a change in logic level signaling technique, other signaling techniques can also be employed. For example, the FIG. 3 signaling circuit could be modified so as to provide a pulse-type signal to indicate the completion time of the position move.

What is claimed is:

1. Position busy apparatus for signaling the completion of a position move of an imaging device in a display system; said apparatus comprising;

dynamic reference distance-generating means for providing reference distances during consecutive time intervals at a rate corresponding to the speed of said imaging device said reference distance generator including a source of clock signals having a frequency which corresponds to the travel rate of said imaging device, and a counter which is preset with an initial Δref value and then is incremented by said clock signals at said travel rate;

means for providing the position distance of said position move where the position distance is the larger of two mutually perpendicular components of the actual position distance;

signaling means including an initializing circuit for initiating operation of said clock source and for presetting said counter; and a position busy circuit responsive (1) to said initializing circuit and (2) to said indicating signal for signaling the start and completion, respectively, of said position move.

2. The invention according to claim 1 wherein means is provided to produce a position start signal;

wherein said initializing circuit includes first means responsive to said position start signal for producing control signals to provide said clock initiation, counter preset and position busy start signaling operations, and second means responsive to said position start signal to provide a masking signal which inhibits said position busy circuit from responding to said indicating signal for a predetermined time.

3. The invention according to claim 2 wherein said position busy circuit includes a coincidence gate having first and second input coupled to receive said indicating signal and said masking signal, respectively, and an output, and a flip-flop circuit having a first input coupled to said coincidence gate output, a second input coupled to receive a first one of said initializing control signals, and an output which produces said start and completion of position move signaling.

4. The invention according to claim 3 wherein said second initializing circuit means includes a one-shot delay circuit responsive to said position start signal to provide said masking signal to said position busy coincidence gate.

5. The invention according to claim 4 wherein said first initializing circuit means includes a. preset flip-flop means responsive to said position start signal to produce a preset signal which corresponds to a second one of said control signals, said preset signal being applied to said counter to perform said preset operation; and b. means further responsive to said position start signal to produce said first control signal.

6. The invention according to claim 5 wherein said providing means includes calculating means for computing said position distance.

* * * * *